(12) United States Patent  
Sridharan et al.

(10) Patent No.: US 8,760,127 B2  
(45) Date of Patent: Jun. 24, 2014

(54) SYSTEM AND METHOD FOR CONTROLLING A TEMPERATURE OF A GENERATOR

(75) Inventors: Balamurugan Sridharan, Karnataka (IN); James Daniel Antalek, Valatie, NY (US); Steven Craig Kluge, Burnt Hills, NY (US); Rebinth Jose Robin, Karnataka (IN); John Russell Yagielski, Scotia, NY (US)

(73) Assignee: General Electric Company, Schenectady, NY (US)

( * ) Notice: Subject to any disclaimer, the term of this patent is extended or adjusted under 35 U.S.C. 154(b) by 754 days.

(21) Appl. No.: 13/077,073

(22) Filed: Mar. 31, 2011

(65) Prior Publication Data

US 2012/0249090 A1    Oct. 4, 2012

(51) Int. Cl.  
*H02P 11/00* (2006.01)

(52) U.S. Cl.  
USPC .................................. 322/33; 322/34; 290/52

(58) Field of Classification Search  
USPC .............................. 322/11, 33, 34, 37; 290/52  
See application file for complete search history.

(56) References Cited

U.S. PATENT DOCUMENTS

| | | | |
|---|---|---|---|
| 3,619,674 A | 11/1971 | Dalmo et al. | |
| 3,950,665 A | 4/1976 | Schneider et al. | |
| 4,274,021 A | 6/1981 | Kamiya et al. | |
| 5,760,371 A | 6/1998 | Dailey et al. | |
| 6,787,933 B2 * | 9/2004 | Claude et al. | 290/52 |
| 6,891,282 B2 * | 5/2005 | Gupta et al. | 290/52 |
| 6,906,432 B2 * | 6/2005 | Belokon et al. | 290/52 |
| 6,978,772 B1 * | 12/2005 | Dorn et al. | 123/568.12 |
| 7,276,134 B2 | 10/2007 | Rowe | |
| 8,492,913 B2 * | 7/2013 | Koeneman et al. | 290/1 A |
| 8,570,002 B2 * | 10/2013 | Burnham et al. | 322/17 |

FOREIGN PATENT DOCUMENTS

| | | |
|---|---|---|
| JP | 57-142153 A | 9/1982 |
| JP | 60-257737 A | 12/1985 |
| JP | 3-289345 A | 12/1991 |
| JP | 2000-125599 A | 4/2000 |

OTHER PUBLICATIONS

Search Report issued in connection with GB Application No. 1205180.1, Jul. 27, 2012.

* cited by examiner

*Primary Examiner* — Nicholas Ponomarenko  
(74) *Attorney, Agent, or Firm* — Cantor Colburn LLP

(57) ABSTRACT

According to one aspect of the invention, a system for controlling a temperature of a generator is provided, wherein the system includes a fluid supply in fluid communication with the generator and a heat exchange apparatus in fluid communication with the fluid supply, the generator and a cooling fluid source. The system also includes a first sensor configured to determine a first temperature of a fluid flowing from the heat exchange apparatus to the generator, a second sensor configured to determine a second temperature of the fluid flowing from the generator to the fluid supply and a controller configured to determine an operating limit temperature for the fluid based on the determined first and second temperatures.

20 Claims, 2 Drawing Sheets

SYSTEM AND METHOD FOR CONTROLLING A TEMPERATURE OF A GENERATOR

BACKGROUND OF THE INVENTION

The subject matter disclosed herein relates to power generators and, more particularly, to a system for cooling a power generator.

During the process of producing electricity, power generators create heat to be dissipated away from the generator to enable safe operation. Some generators use fluid cooling to dissipate this heat. In many generators, the fluid is a water or water solution. In the cooling systems the fluid is circulated through conduits proximate stator armature bars, wherein the fluid cools the stator to enable safe operation of the generator.

In some fluid cooled generators, a temperature of the bulk cooling fluid leaving the generator is monitored to ensure that the generator is operating safely. A fixed threshold operating temperature is compared to the detected temperature to determine if the generator is safely operating or should be shut down (or "tripped"). The bulk coolant temperature is an average of the temperatures of the coolant through many parallel cooling paths, and may not directly measure the hottest temperature. In situations where the temperature of the cooling fluid entering the generator may vary significantly, related to the ambient temperature and environment, the generator may be shut down even though the stator is operating safely. For example, in situations where the ambient temperature is elevated and the coolant entering the generator is likewise elevated, the generator fluid outlet temperature may be elevated, yet the stator remains operational and effectively cooled, as the hottest coolant in the winding is below an acceptable level. Such situations can cause the generator to be tripped unnecessarily when safely operating, thereby causing costly power plant outages.

BRIEF DESCRIPTION OF THE INVENTION

According to one aspect of the invention, a system for controlling a temperature of a generator is provided, wherein the system includes a fluid supply in fluid communication with the generator and a heat exchange apparatus in fluid communication with the fluid supply, the generator and a cooling fluid source. The system also includes a first sensor configured to determine a first temperature of a fluid flowing from the heat exchange apparatus to the generator, a second sensor configured to determine a second temperature of the fluid flowing from the generator to the fluid supply and a controller configured to determine an operating limit temperature for the fluid based on the determined first and second temperatures.

According to another aspect of the invention, a method for controlling a temperature of a generator is provided, wherein the method includes directing a fluid from a heat exchange apparatus to the generator, directing the fluid from the generator to a fluid supply and determining a first temperature of the fluid flowing from the heat exchange apparatus to the generator. The method further includes determining a second temperature of the fluid flowing from the generator to the fluid supply and determining an operating limit temperature for the fluid based on the determined first and second temperatures.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
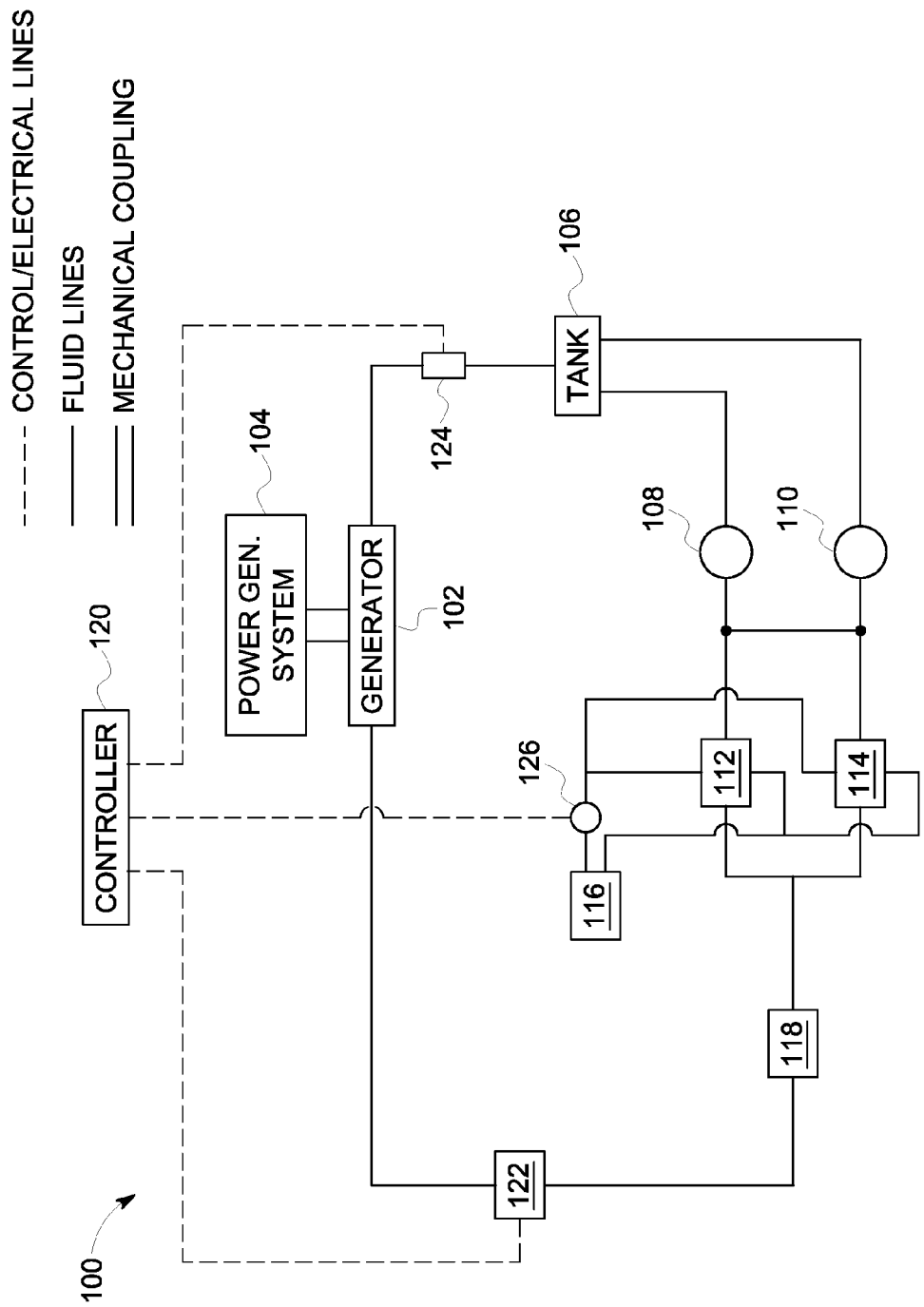
FIG. 1 is a schematic diagram of an exemplary cooling system to be used in a power generation plant.

FIG. 1 is a schematic diagram of an exemplary cooling system 100 to be used in a power generation plant. The cooling system 100 is configured to cool a generator 102 which is coupled to a power generation system 104. The coupling may be a shaft or gear system configured to transmit mechanical energy from the power generation system 104 to the generator 102. The power generation system 104 includes any system suitable for generating large amounts of power, including, but not limited to, a combined cycle turbine system, a gas turbine system or a steam turbine system. The cooling system 100 includes a tank 106, a pumping device 108, a pumping device 110, a heat exchanger 112, a heat exchanger 114 and a heat exchanger fluid source 116. The cooling system 100 further includes a filter 118, a controller 120, a sensor module 122, a sensor module 124 and a flow control device 126.

As depicted, a cooling fluid is directed via conduits between selected components of the cooling system 100 while the controller 120 transmits and receives signals, such as electrical signals, to and from other system components. The cooling fluid is directed along one or more conduits or other suitable fluid communication channels proximate a stator of the generator 102. Current flow through windings in the stator generate heat that is transferred to conduits configured to absorb the heat. Accordingly, exemplary conduits are proximate to and/or in contact with the stator to enable thermal communication of the heat to the cooling fluid flowing through the conduits. The cooling fluid may be any suitable fluid with the desired properties for a cooling application. Examples of cooling fluid include water, a water-based solution and an antifreeze solution.

Still referring to FIG. 1, after absorbing heat from the stator of the generator 102, the cooling fluid is directed to the tank 106, where the cooling fluid is treated to enable improved cooling of the cooling fluid by the heat exchangers 112 and 114. As shown, the sensor module 124 is configured to measure one or more parameters of the cooling fluid flowing from the generator 102. The sensor module 124 includes suitable sensors and hardware for performing the exemplary measurements. The measured parameters may include temperature, conductivity and pressure. In other embodiments, various parameters may also be measured, such as pH, dissolved $H_2$, dissolved $O_2$, and others. Accordingly, the exemplary sensor module 124 includes a temperature sensor, a pressure sensor and a conductivity sensor. The exemplary sensor module 122 also includes similar sensors and hardware configured to measure parameters of the cooling fluid before it flows into the generator 102. Specifically, the sensor module 122 includes sensors configured to measure temperature, conductivity and pressure of the cooling fluid prior to flowing into the generator 102. Accordingly, the controller 120 includes suitable hardware and software to process the measured parameters from the sensor modules 122 and 124.

Further, in an embodiment, the controller 120 uses the measured temperatures from the sensor modules 122 and 124 to determine the highest temperature of the cooling fluid in the stator cooling conduits and to further determine the operating limit temperature for the cooling fluid as it leaves the generator 102. The operating limit temperature is determined using suitable software, algorithms and equations as described in further detail below. The operating limit temperature is the upper limit of a range of acceptable temperatures for safe operation of the generator 102. In one embodiment, the operating limit temperature is determined in real time, wherein the sensor modules 122 and 124 measure the cooling fluid temperatures continuously to determine the operating limit temperature real time. The real time measurements and calculations may occur at any suitable interval, such as ranging from about 0.2 to about 50 Hertz (Hz). In one example, the measurements and calculations by the controller 120 and sensor modules 122 and 124 occur at about 20 to about 30 Hz. Further, in another example, the measurements and calculations occur instantaneously and in real time at about 25 Hz. As used herein the term controller refers to an application specific integrated circuit (ASIC), an electronic circuit, a processor (shared, dedicated or group) and memory that executes one or more software or firmware programs, a combinational logic circuit, and/or other suitable components that provide the described functionality. Further, as used herein the term real time refers to a process, step, method, apparatus or device that may be configured to perform at least one function or task at a selected interval.

With continued reference to FIG. 1, after directing the cooling fluid to the tank 106, the cooling system 100 directs the cooling fluid to the heat exchangers 112 and 114 via pumping devices 108 and 110. The heat exchangers 112 and 114 may operate in parallel or may be used in alternating fashion, depending on cooling system needs and configuration. Further, in some embodiments, a single heat exchanger 112, 114 may be used to remove heat from the cooling fluid. The heat exchangers 112 and 114 are any suitable type of heat exchanger, such as plate and frame or shell and tube heat exchangers, wherein the heat exchanger fluid source 116 is configured to provide heat exchanger fluid to receive heat from the cooling fluid in the heat exchangers 112 and 114. As depicted, control of a flow position of the flow control device 126 is controlled by the controller 120, wherein the controller 120 can restrict flow of the heat exchanger fluid to the heat exchangers based on selected inputs, such as measured parameters (e.g., temperatures) from the sensor modules 122 and 124. In some embodiments, the cooling system may not include the flow control device 126. After cooling of the cooling fluid by one or both heat exchangers 112 and 114, the cooling fluid is directed to the filter 118, wherein contaminants are removed from the cooling fluid. The cooling fluid is then directed through the sensor module 122, wherein parameters of the cooling fluid are measured and determined, as described above. The generator 102 then receives the cooling fluid, where conduits proximate the stator enable heat to transfer from the stator windings to the cooling fluid. As described below, the cooling system 100 is configured to determine the operating limit temperature in real time. The real time determination of the operating limit temperature allows an increased operating temperature for the cooling system 100 when the temperature increase across the generator 102 is below the determined operating limit temperature. Accordingly, the exemplary arrangement provides an increased range of operating environments and conditions for the generator 102, thereby allowing safe power generation across a broad range of climates.

Figure 2:
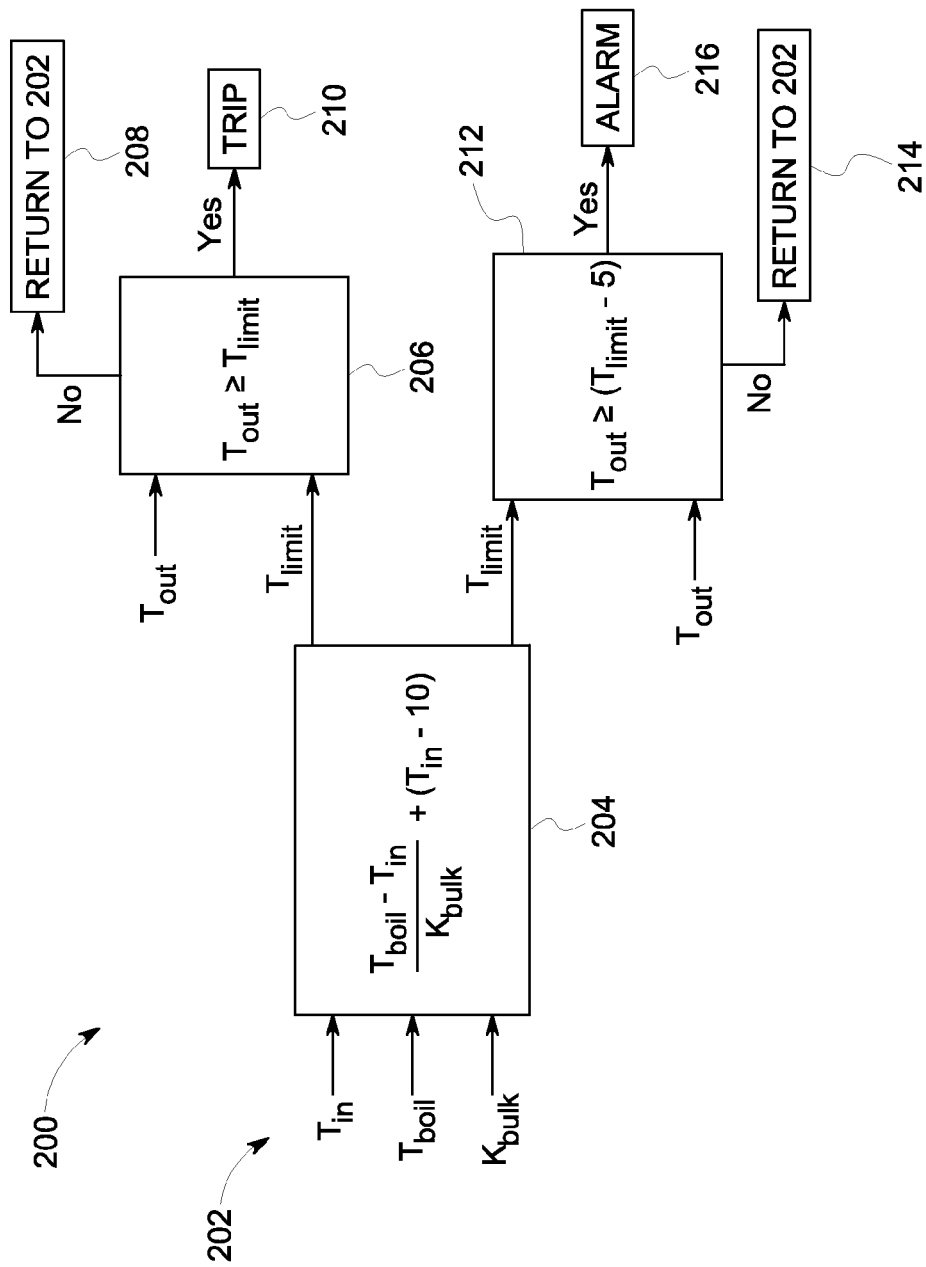
FIG. 2 is an exemplary logic diagram of steps performed by the cooling system.

FIG. 2 is an exemplary logic diagram 200 (or "flow chart") of steps performed by the cooling system 100. In one embodiment, the steps of the logic diagram 200 are performed by the controller 120. A set of inputs 202 are received by a first block 204, wherein the inputs 202 are inputs to an equation used to determine an operating limit temperature ($T_{limit}$). The inputs 202 include a sensed cooling fluid inlet temperature ($T_{in}$), a boiling point temperature ($T_{boil}$) and a constant ($K_{bulk}$) based on stator winding properties. In the embodiment shown in FIG. 1, the cooling fluid inlet temperature ($T_{in}$) is measured by the sensor module 122. The boiling point temperature ($T_{boil}$) is a constant or static value for each system determined based on elevation, environment, cooling fluid properties and other relevant factors. An exemplary boiling point temperature ($T_{boil}$) for water at sea level is 100 degrees Celsius. The block 204 uses Celsius values for boiling point temperature ($T_{boil}$) and fluid inlet temperature ($T_{in}$). The constant $K_{bulk}$ represents the relationship between the coolant temperature rise at the hottest location of the parallel paths in the coolant circuit in ratio to the coolant temperature rise observed between the inlet and outlet to the generator. The constant is a function of the physical arrangement of the cooling circuit within the generator. In an embodiment, the block 204 is used to determine the operating limit temperature based on two constant or static inputs, $T_{boil}$ and $K_{bulk}$, for a particular cooling system 100 application. As described above, the cooling fluid inlet temperature ($T_{in}$) is measured at a selected interval, wherein the continuous and repeated measurements enable a determination of the operating limit temperature ($T_{limit}$) in real time.

As shown in block 206, the operating limit temperature ($T_{limit}$) is compared to a determined cooling fluid outlet temperature ($T_{out}$), wherein the determinations and comparisons are in real time. In the embodiment shown in FIG. 1, the cooling fluid outlet temperature ($T_{out}$) is measured by the sensor module 124. The comparison in the block 206 determines if the cooling fluid outlet temperature ($T_{out}$) is greater than or equal to the operating limit temperature ($T_{limit}$). If the comparison result is no, then block 208 directs the logic diagram to receive the inputs 202, thereby providing an updated determination of the operating limit temperature ($T_{limit}$) based on a new measurement of inlet temperature ($T_{in}$). If the comparison result is yes, block 210 indicates that the power generation system 104 is tripped, wherein the generator 102 is shut down, taken off line and/or allowed to coast down to prevent damage. Block 212 also includes a comparison of the cooling fluid outlet temperature ($T_{out}$) to the operating limit temperature ($T_{limit}$). The block 212 may be described as an alarm comparison step, wherein step determines if the cooling fluid outlet temperature ($T_{out}$) is greater than or equal to the operating limit temperature ($T_{limit}$) minus a margin which may be 5 degrees (Celsius). If the comparison result is no, then block 214 directs the logic diagram to receive the inputs 202, thereby providing an updated determination of the operating limit temperature ($T_{limit}$) based on a new measurement of inlet temperature ($T_{in}$). If the comparison result is yes, block 216 causes an alarm for the cooling system 100, wherein an alarm, such as an audible and/or visual alarm, notifies an operator that the generator 102 is approaching the operating limit temperature ($T_{limit}$). As discussed above, the continuous or real time determination of inlet temperature ($T_{in}$), operating limit temperature ($T_{limit}$) and outlet temperature ($T_{out}$) enables generator 102 operation over a range of temperatures. In an embodiment, the real time determination of the operating limit temperature ($T_{limit}$) is based on an allowable level of temperature increase of the cooling fluid flowing across the stator, which then compared to the outlet temperature ($T_{out}$) in real time, thereby providing acceptable generator 102 operating temperatures for high, low and variable temperature climates.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for controlling a temperature of a generator, the system comprising:
   a fluid supply in fluid communication with the generator;
   a heat exchange apparatus in fluid communication with the fluid supply and the generator;
   a first sensor configured to determine a first temperature of a fluid flowing from the heat exchange apparatus to the generator;
   a second sensor configured to determine a second temperature of the fluid flowing from the generator to the fluid supply; and
   a controller configured to determine an operating limit temperature for the fluid based on the determined first and second temperatures.

2. The system of claim 1, wherein the controller is configured to determine operating limit temperature in real time.

3. The system of claim 2, wherein the operating limit temperature comprises a threshold temperature below which the generator can safely run and above which the generator may be tripped off.

4. The system of claim 1, wherein the fluid supply comprises a pumping device and a tank.

5. The system of claim 1, wherein the fluid comprises a water solution.

6. The system of claim 1, wherein the controller is configured to control a flow of a heat exchanger fluid into the heat exchange apparatus.

7. The system of claim 1, wherein the controller is configured to cause an alarm or trip the generator based on the operating limit temperature.

8. The system of claim 1, wherein the heat exchange apparatus comprises at least one plate and frame heat exchanger configured to cool the fluid using a heat exchanger fluid.

9. The system of claim 1, comprising a third sensor configured to determine a first conductivity of the fluid entering the generator and a fourth sensor configured to determine a second conductivity of the fluid flowing from the generator.

10. The system of claim 1, wherein the generator is configured to be coupled to a combined cycle turbine system.

11. A method for controlling a temperature of a generator, the method comprising:
    directing a fluid from a heat exchange apparatus to the generator;
    directing the fluid from the generator to a fluid supply;
    determining a first temperature of the fluid flowing from the heat exchange apparatus to the generator;
    determining a second temperature of the fluid flowing from the generator to the fluid supply; and
    determining an operating limit temperature for the fluid based on the determined first and second temperatures.

12. The method of claim 11, wherein determining the operating limit temperature comprises determining the operating limit temperature in real time.

13. The method of claim 12, wherein the operating limit temperature comprises a threshold temperature below which the generator can safely run and above which the generator may be tripped off.

14. The method of claim 11, comprising control a flow of a cooling fluid from a cooling fluid source in fluid communication with the heat exchange apparatus via a two way flow control device.

15. The method of claim 11, comprising creating an alarm or trip for the generator based on the operating limit temperature.

16. The method of claim 11, wherein directing the fluid from the heat exchange apparatus comprises directing the fluid from at least one plate and frame heat exchanger configured to cool the fluid before it is directed to the generator.

17. The method of claim 11, comprising determining a first conductivity of the fluid entering the generator and determining a second conductivity of the fluid flowing from the generator.

18. The method of claim 17, comprising creating an alarm based on the first and second conductivities.

19. A system for controlling a temperature of a generator, the system comprising:
    a fluid supply in fluid communication with the generator;
    a heat exchange apparatus in fluid communication with the fluid supply and the generator;
    a first sensor configured to determine a first temperature of a fluid flowing into the generator;
    a second sensor configured to determine a second temperature of the fluid flowing from the generator; and
    a controller configured to continuously determine an operating limit temperature for the fluid based on the determined first and second temperatures.

20. The system of claim 19, wherein the controller is configured to continuously determine the operating limit temperature at a selected frequency, thereby enabling safe operation of the generator if the determined second temperature is acceptable as the first temperature varies.

* * * * *